United States Patent [19]

Goldhahn

[11] Patent Number: 4,547,383

[45] Date of Patent: Oct. 15, 1985

[54] CONTINUOUS FOOD STERILIZATION SYSTEM WITH HYDROSTATIC SEALED TREATMENT CHAMBER

[75] Inventor: Stephen L. Goldhahn, Stratford, N.J.

[73] Assignee: Campbell Soup Company, Camden, N.J.

[21] Appl. No.: 501,821

[22] Filed: Jun. 7, 1983

[51] Int. Cl.[4] .............................................. A23L 3/16
[52] U.S. Cl. ................................ 426/524; 99/470; 426/511; 426/521
[58] Field of Search .............. 426/524, 521, 511, 506; 426/507; 99/361, 362, 470, 483, 517, 478, 345, 443 C; 422/26

[56] References Cited

U.S. PATENT DOCUMENTS

| | | | |
|---|---|---|---|
| 2,556,385 | 6/1951 | Allan | 99/443 C |
| 2,660,512 | 11/1953 | Webster | 422/26 |
| 2,818,012 | 12/1957 | Webster | 99/362 |
| 2,968,232 | 1/1961 | Carvallo | 99/362 |
| 3,088,180 | 5/1963 | Lauterbach | 422/26 |
| 3,286,619 | 11/1966 | Lee | 99/362 |
| 3,377,173 | 4/1968 | Van Der Winden | 99/361 |
| 3,394,793 | 7/1968 | Reimers et al. | 99/362 |
| 3,407,721 | 10/1968 | Carvallo | 99/362 |
| 3,469,988 | 9/1969 | Yawger | 99/362 |
| 3,545,985 | 12/1970 | Mencacci et al. | 99/362 |
| 3,608,475 | 9/1971 | Scott | 99/362 |
| 3,880,068 | 4/1975 | Goodale | 99/478 |
| 3,927,976 | 12/1975 | Reimers et al. | 426/511 |
| 3,986,832 | 10/1976 | Smorenburg | 422/26 |
| 4,195,061 | 3/1980 | Kalasek | 422/25 |

Primary Examiner—George Yeung
Attorney, Agent, or Firm—Banner, Birch, McKie & Beckett

[57] ABSTRACT

Apparatus and method for continuously cooking and sterilizing particulate food material are disclosed wherein the outlet of a pressurized steam treatment chamber is sealed by hydrostatic sealing means in which sterilized, particulate food material is simultaneously cooled and depressurized as it is removed from the treatment chamber.

4 Claims, 2 Drawing Figures

CONTINUOUS FOOD STERILIZATION SYSTEM WITH HYDROSTATIC SEALED TREATMENT CHAMBER

BACKGROUND OF THE INVENTION

1. Field of the Invention

This invention pertains to apparatus and method useful in the aseptic canning of particulate food material. More particularly, this invention relates to apparatus and method for continuously cooking and sterilizing particulate food material without substantially altering its texture, taste and nutritional value.

2. Description of the Prior Art

In the conventional process for canning foods, containers are first filled with food product and sealed. Thereafter, the sealed containers are heated in a pressure cooker or retort to sterilize the canned product. Inadequate preservation of the canned food material's organoleptic quality is one well-recognized problem associated with this approach. To insure that every food piece is adequately sterilized, unavoidable overheating of at least some of the food pieces occurs. This is particularly true when some of the canned food pieces require different heating times to reach sterilization conditions. In particular, those foods requiring less time for sterilization generally tend to be overheated. Heat transfer limitations with the conventional sterilization approach represents still another drawback. Sterilizing food material by transferring heat through both a container and a contained fluid requires more energy than would otherwise be consumed if the canned material were sterilized directly.

Recognizing these limitations, the prior art has proposed procedures for aseptically canning food material. In aseptic canning, food material is sterilized before it is sealed in a container. Generally, food material is quickly heated to sterilization temperatures, typically in the range of 250° F. to 300° F., by direct contact with pressurized steam. The food material is maintained at such temperatures for sufficient time to effect sterilization. Thereafter, the food material is rapidly cooled and the cooled, sterile material is filled into pre-sterilized containers and sealed within a sterile or aseptic environment.

In a particularly efficient and convenient sterilization arrangement, food material is conveyed through a pressurized steam treatment chamber. In this arrangement, heat treatment is controlled simply by controlling the rate food material is passed through the treatment chamber. In order to insure the food material rapidly achieves sterilization temperatures, a temperature in the range of 250° F. to 300° F. must be maintained in the treatment chamber. This condition is obtained using super atmospheric pressure steam, at pressures of, for example, about 10 to about 55 psig.

To date, the basic arrangement for feeding solid particulate food material into and withdrawing it from a pressurized steam treatement chamber involves some type of rotary valve. Both inlet and outlet valves act as seals to maintain pressure within the treatment chamber. One problem with rotary valves, however, is that structural degredation of the product often occurs as a result of mechanical abrasion. This is particularly true at the outlet valve where the texture of the food product, to some extent, has been unavoidably impaired by sterilization and is consequently more suseptible to mechanical damage. Another drawback of rotary valves is that at the ever increasing processing speeds demanded by food processors, there often is insufficient residence time within the outlet valve for adequately cooling the food material to a temperature that avoids product flashing. Flashing is caused by rapid vaporization of hot liquid from within the food material caused by its sudden depressurization. Flashing, which tends to disintegrate the solid food particles, can only be avoided by cooling the food material below the atmospheric boiling point of absorbed liquid before depressurization. An improved apparatus and method for removing solid food material from pressurized steam treatment chambers would be very useful to the food processing industry.

It is an object of this invention to provide apparatus and method for removing solid particulate food material from a pressurized steam treatment chamber.

It is another object of this invention to provide apparatus and method for removing solid particulate food material from a pressurized steam treatment chamber while avoiding product flashing.

It is still another object of this invention to provide apparatus and method for removing solid particulate food material from a pressurized steam treatment chamber while preventing its disintegration, attrition and mushing.

Other objects and advantages of the invention will become apparent from the following description.

SUMMARY OF THE INVENTION

In one aspect, the present invention relates to apparatus for continuously heat treating particulate food material with steam at super atmospheric pressure of the type having a steam treatment chamber with pressure-tight inlet and outlet openings through which particulate foods are fed into and discharged from the treatment chamber.

The invention particularly relates to an improvement wherein a hydrostatic sealing means seals the outlet opening of the treatment chamber. The hydrostatic sealing means comprises a column of liquid in communication with the treatment chamber's outlet opening as well as with a region of lower pressure, whereby the liquid column balances the steam pressure in the treatment chamber. The liquid in the hydrostatic sealing means constitutes a broth for the treated particulate food material. The apparatus also includes means for cooling liquid in the hydrostatic sealing means and means for conveying particulate food material discharged from the treatment chamber through the hydrostatic sealing means to the region of lower pressure. By this arrangement, hot food products discharged from the treatment chamber are cooled and gradually depressurized so as to avoid flashing and loss of structural integrity while extraction of valuable components such as vitamins, minerals and flavors from the food material is simultaneously prevented.

In another aspect, the present invention relates to a method for cooling particulate food material discharged from a pressurized steam treatment chamber having pressure-tight inlet and outlet openings comprising:

(a) providing hydrostatic sealing means to seal the outlet opening of the treatment chamber, said sealing means comprising a column of liquid in communication with the outlet opening and with a region of lower pressure, the liquid in the liquid column balancing the steam pressure in the treatment chamber, the liquid constituting a broth for the treated particulate food material;

(b) discharging particulate food material from said treatment chamber into said liquid column;

(c) cooling the liquid in the hydrostatic sealing means; and (d) conveying said discharged particulate food material through said liquid column to the region of low pressure so that the temperature of absorbed liquid in said food material is always below its boiling point at the pressure prevailing around the food material; whereby the particulate food material is cooled and gradually depressurized as it is conveyed through the liquid column.

DETAILED DESCRIPTION

The phrase "particulate food material" is intended to embrace a wide variety and size of solid food materials from small vegetable pieces commonly used as garnish in soups, such as carrot, celery, onion and potato dices and corn kernals, to whole food items such as broccoli and asparagus spears and cauliflower florets. Fruits, meats and seafoods are also included within the intended meaning of food material. Generally, the size of the food material treated with this invention is determined by final product considerations. This phrase is intended to exclude liquid and semi-solid food materials such as tomato sauce.

Figure 1:
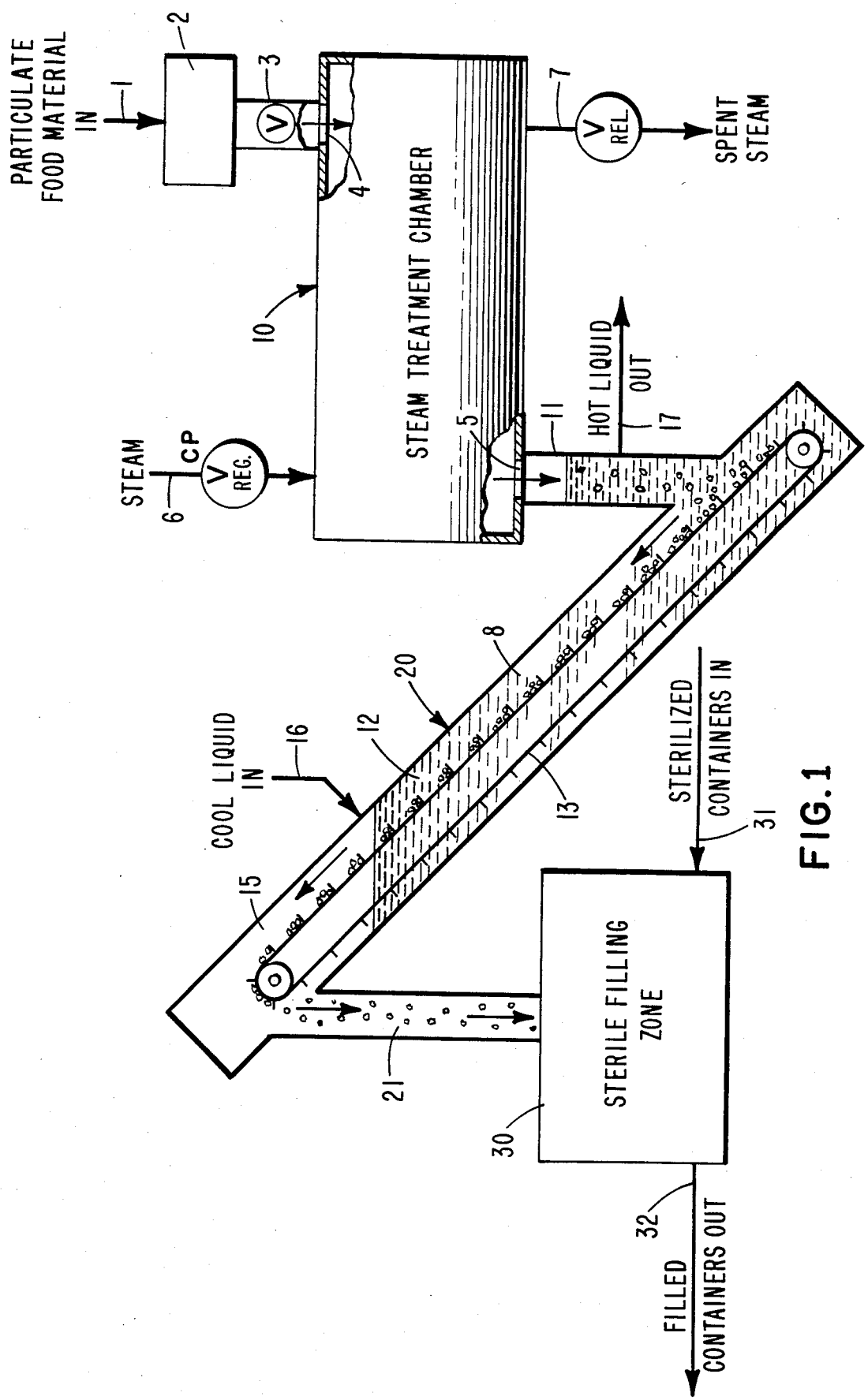
FIG. 1 schematically illustrates apparatus for practicing the present invention.

Referring to FIG. 1, particulate food material is delivered to pressurized steam treatment chamber 10 through line 1. Particulate food material is temporarily stored in surge bin or feed hopper 2 and is controllably metered into chamber 10 through valve assembly 3. Generally, valve assembly 3 is a rotary type valve typically having a cylindrical, closed-end shell which in combination with a driven internal rotor defines moving pockets which serially advance metered amounts of particulate food material from hopper 2 into treatment chamber 10.

Pressurized steam treatment chamber 10 can be of any conventional design. Generally, treatment chamber 10 will comprise a horizontal or slightly inclined cylindrical shell adapted to withstand an internal pressure between about 10 to about 55 psig. Chamber 10 will normally be operated at a pressure of about 15 psig. High temperature, pressurized steam is fed into treatment chamber 10 through conduit 6 which typically includes a pressure control valve for regulating the supply pressure independently of a higher source pressure. Spent steam is withdrawn through pressure release valve-controlled conduit 7. Chamber 10 also includes means for transporting particulate food material from inlet opening 4 to outlet opening 5. This can be done simply by inclining the chamber 10 and rotating or oscillating it on its axis to thereby cause particulate food material to tumble through the chamber. Preferably, chamber 10 is provided with means for positively urging food material therethrough, such as a helical conveying screw or conveying paddles. These latter arrangements allow better control of the food material's residence time in the treatment chamber and also tend to cause less abrasion. Adequate control of residence time is particularly important if continuous sterilization is to be obtained without seriously impairing the food materials organoleptic quality. The food material is normally subject to a steam temperature above about 121° C. for at least about 20 minutes. In the broad practice of this invention, however, steam temperatures from above about 100° C. are contemplated.

Heat treated, particulate food material is discharged from treatment chamber 10 into the liquid column 8 of hydrostatic sealing means 20. Obviously, the steam treatment temperature will determine the temperature of the discharged food material. Typically, the temperature of the food material will be about 120° C. In this preferred embodiment, liquid column 8 of hydrostatic sealing means 20 comprises an inner portion 11 interconnected with an outer portion 12. The inner portion communicates with outlet opening 5 of treatment chamber 10, while the outer portion communicates with low pressure region 15. The height of the liquid column 8 is sufficient to balance the steam pressure in treatment chamber 10. In order to seal a treatment chamber operating at pressures between about 10 to about 55 psig., liquid column heights between about 20 and about 130 feet are required. The liquid height needed to seal the treatment chamber at any particular operating pressure is readily apparent to one skilled in the art.

Particulate food material descends through inner portion 11 and is collected by endless conveyer 13. Conveyer 13 can be of a conventional design and transports the particulate food material upwardly through outer portion 12. Other arrangements for conveying the food material through the hydrostatic sealing means will be apparent to those skilled in the art. For example, a screw conveyor could be substituted for endless conveyor 13. The food material is cooled and gradually depressurized as it is conveyed upwardly through outer portion 12.

Generally, the treated food material will be conveyed through the hydrostatic sealing means to an atmospheric pressure region. Consequently, to avoid product flashing the temperature of absorbed liquid in the treated food material must be less than 100° C. as it exits the hydrostatic sealing means. More precisely, to prevent product flashing at every point in the food material's travel through the hydrostatic sealing means, the temperature of absorbed liquid in the treated food material must be below its boiling point at the pressure prevailing around the food material. Liquid in the sealing means must be maintained at an appropriate temperature to provide this result. Since hot food material is continuously discharged into and conveyed through the hydrostatic sealing means, the liquid in hydrostatic sealing means 20 must be cooled. While a wide temperature distribution is possible depending upon such factors as the nature of the food material being treated, the food material's exit temperature from treatment chamber 10, the speed of conveyor 13, etc., the liquid in at least the upper section of outer portion 12 is generally maintained at about 95°-98° C. while the liquid at the bottom of outer portion 12 is generally maintained at about 115°-125° C. At these conditions, the speed of conveyor 13 is generally regulated so that it takes a few minutes, e.g., about 2-6 minutes, for the food material to be conveyed through the hydrostatic sealing means.

An appropriate temperature distribution for cooling food material can be maintained in hydrostatic sealing means 20, for example, by delivering cooled liquid thereto through conduit 16 and withdrawing hot liquid therefrom through conduit 17. Alternatively, liquid in hydrostatic sealing means 20 can be cooled by locating appropriately designed indirect heat transfer surfaces; e.g., cooling coils, within liquid column 8, preferably in outer portion 12. In any event, the speed of conveyor 13 is controlled such that as particulate food material is gradually depressurized, and simultaneously cooled, the temperature of absorbed liquid is always below its boiling point at the pressure prevailing around the food material. In this way, product flashing is prevented. The combination of high-efficiency direct liquid cooling and the extended path traveled by conveyor 13 through hydrostatic sealing means 20 permits high-speed continuous operation without creating a product flashing problem.

An important aspect of this invention is its use of broth as the liquid in hydrostatic sealing means 20. As used herein, the term "broth" broadly refers to an aqueous liquid having a concentration of vitamins, minerals, flavor constituents, etc., that retards or prevents the extraction of water soluble components from a particulate food material as it passes through the hydrostatic sealing means. By employing broth as the cooling liquid, the taste and nutritional value of food material can be better preserved. The necessary broth can be conviently developed by recirculating liquid in the hydrostatic sealing means through a closed loop, as will be more fully described hereafter in connection with FIG. 2.

Endless conveyor 13 is designed so that liquid can drain therethrough as it emerges from the outer liquid column 12. In this way, free liquid is permitted to drain from the particulate food material before it is discharged from conveyor 13 into duct 21.

Cool and depressurized, treated food material is discharged from the upper end of conveyor 13 falling through duct 21 to sterile or aseptic filling zone 30. Duct 21 can be provided as a column and relatively dry, sterile gas can be flowed upwardly therethrough if a dry product is desired for canning. Sterilized containers are fed to zone 30, as indicated at 31, and filled containers are discharged therefrom as indicated at 32. If desired the filled cans can then be sealed, either before or after filling with additional ingredients.

Figure 2:
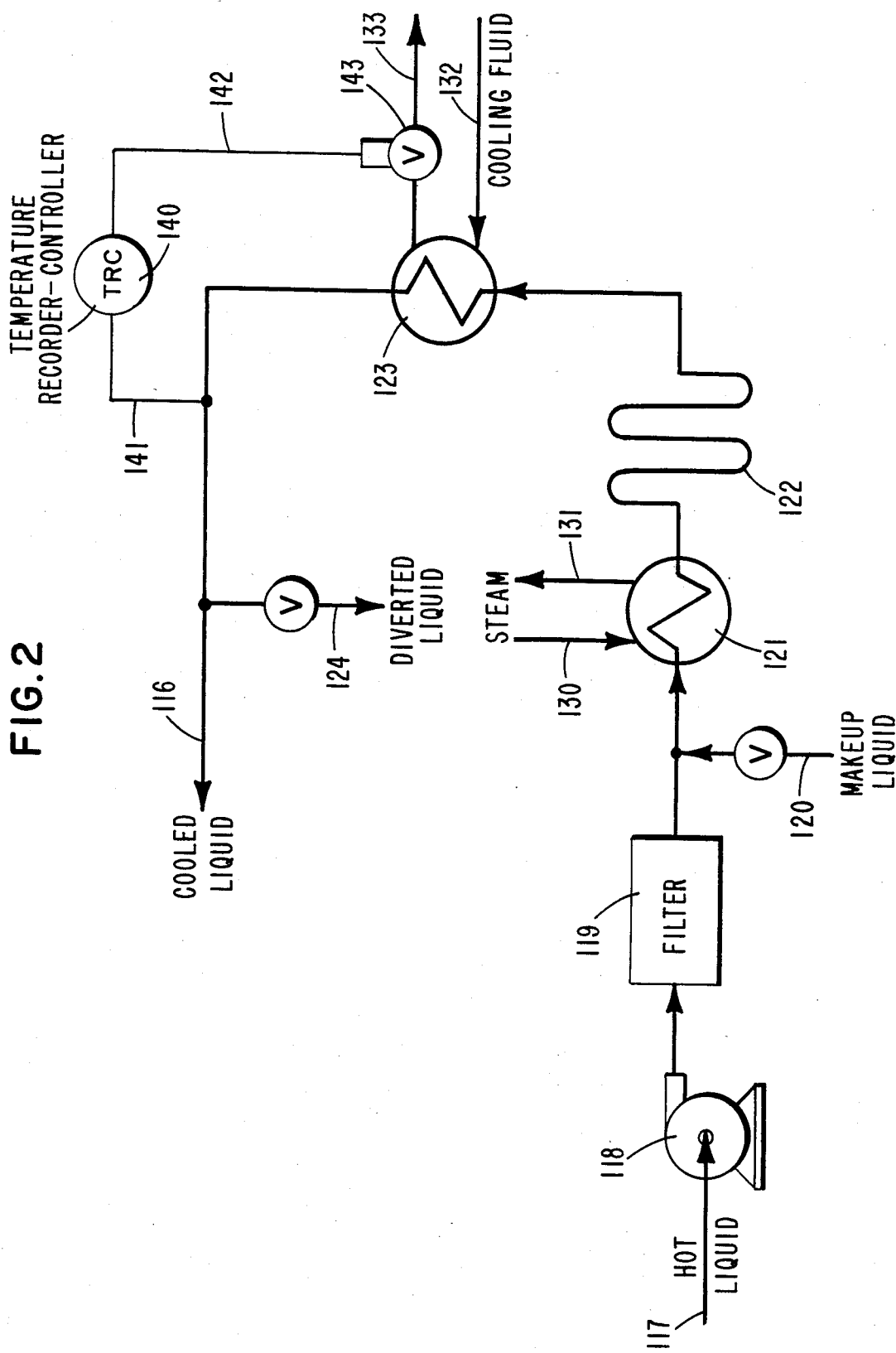
FIG. 2 illustrates a preferred arrangement for cooling liquid in the hydrostatic sealing means.

A preferred way of cooling liquid in hydrostatic sealing means 20 is illustrated in FIG. 2. Hot liquid withdrawn through conduit 17 from liquid column 8 at inner portion 11 is passed through conduit 117 to pump 118. The liquid is pumped through filter 119 to remove large solids and makeup liquid is then added through valved-conduit 120 as required to maintain the hydrostatic seal. The liquid is then sterilized by indirect heat exchange with steam in heater 121. The liquid is held at the required sterilization temperature in holding tube 122 and is thereafter cooled by indirect heat exchange with cooling fluid in cooling zone 123. The degree of cooling is controlled by temperature recorder-controller 140 which senses the temperature of the cooled liquid through sensing means 141 and appropriately adjusts the cooling fluid flow rate via line 142 and valve 143. A quantity of liquid is diverted as required from the cooling circuit through valved-conduit 124 to prevent the excessive buildup of certain constituents in the cooling circuit. Additionally, if desired, broth can be continuously diverted through conduit 124 for use as a liquid filler or sauce in canning the particulate food material. Cooled liquid is then returned to the hydrostatic sealing means through conduit 116 and is injected into the sealing means through conduit 16. By this arrangement, valuable constituents, for example flavors, vitamins and minerals, extracted from a particulate food material are equilibrated in the liquid. This condition prevents further leaching of such components from the particulate food material. As another important feature, the circulating liquid can be monitored for salt level and pH and appropriately adjusted as desired.

While preferred embodiments of this invention have been discussed herein, those skilled in the art will appreciate that changes and modifications may be made without departing from the spirit and the scope of this invention, as defined in and limited only by the scope of the appended claims. For example, while the present invention has been specifically described with respect to the sterilization of particulate food materials, and has been shown to have particular utility therein, it is anticipated that the invention may also have applicability to the continuous heat treatment of food materials solely to inactivate enzymes and destroy molds which is done at somewhat lower temperatures and pressures.

I claim:

1. A method for cooling particulate food material discharged from a pressurized steam treatment chamber having pressure-tight inlet and outlet openings comprising:
   (a) providing hydrostatic sealing means to seal the outlet opening of the treatment chamber, said sealing means comprising a column of liquid in communication with the outlet opening and with a region of lower pressure, the liquid column having a height in the range of about 20 to about 130 feet for balancing a steam pressure in the range of about 10 to about 55 psig in the treatment chamber, said liquid constituting a broth for the treated particulate food material;
   (b) discharging particulate food material from said treatment chamber to said liquid column;
   (c) cooling the liquid of the hydrostatic sealing means; and
   (d) conveying said discharged food material through said liquid column to said region of lower pressure so that the temperature of absorbed liquid in said food material is always below its boiling point at the pressure prevailing around the food material whereby the particulate food material is cooled and gradually depressurized as it is conveyed through the liquid column.

2. The method of claim 1 wherein the particulate food material is selected from the group consisting of meats, vegetables, fruits and seafoods.

3. The method of claim 1 wherein the particulate food material is dried by direct contact with a relatively dry gas in said region of low pressure.

4. The method of claim 3 wherein the dried, particulate food material is passed to an aseptic filling zone.

* * * * *